United States Patent
Gondoh (10) Patent No.: US 7,199,727 B2
(45) Date of Patent: Apr. 3, 2007

(54) ELECTROSTATIC ENCODER AND ELECTROSTATIC DISPLACEMENT MEASURING METHOD

(75) Inventor: Masahiko Gondoh, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 186 days.

(21) Appl. No.: 11/042,897

(22) Filed: Jan. 25, 2005

(65) Prior Publication Data

US 2005/0195097 A1    Sep. 8, 2005

(30) Foreign Application Priority Data

Feb. 9, 2004 (JP) ............................. 2004-032016

(51) Int. Cl.
 *H03M 1/22* (2006.01)
 *G08B 21/00* (2006.01)
 *G01R 27/26* (2006.01)
(52) U.S. Cl. .................. 341/15; 341/116; 340/686.1; 324/660
(58) Field of Classification Search ............ 341/10–15, 341/110–118; 340/686.1; 324/658.1, 660
See application file for complete search history.

(56) References Cited

U.S. PATENT DOCUMENTS 3,717,869 A * 2/1973 Batz ........................... 341/11
3,766,544 A * 10/1973 Batz ........................... 341/15
4,879,508 A   11/1989 Andermo

FOREIGN PATENT DOCUMENTS

JP   1-29409    6/1989
JP   4-67881    10/1992

OTHER PUBLICATIONS

Patent Abstracts of Japan of Japanese Publication No. 59-180462, published Oct. 13, 1984.

* cited by examiner

*Primary Examiner*—Lam T. Mai
(74) *Attorney, Agent, or Firm*—Scully, Scott, Murphy & Presser, P.C.

(57) ABSTRACT

An electrostatic encoder comprises a movable element having electrodes and a stator having induction electrodes and potential detection electrodes. The electrostatic encoder further comprises a voltage driving circuit configured to apply a voltage to the induction electrodes of the stator, and generate alternate potential distribution in the electrodes of the movable element by electrostatic induction, a vector generation circuit configured to generate a vector consisting of two signal components, from outputs of the potential detection electrodes of the stator which detect the alternate potential distribution, and a phase splitter circuit configured to measure the relative displacement of the movable element to the stator, from a rotation angle of the vector consisting of the two signal components outputted from the vector generation circuit.

22 Claims, 5 Drawing Sheets

ELECTROSTATIC ENCODER AND ELECTROSTATIC DISPLACEMENT MEASURING METHOD

CROSS-REFERENCE TO RELATED APPLICATIONS

This application is based upon and claims the benefit of priority from prior Japanese Patent Application No. 2004-032016, filed Feb. 9, 2004, the entire contents of which are incorporated herein by reference.

BACKGROUND OF THE INVENTION

1. Field of the Invention

The present invention relates to an electrostatic encoder which detects position information by the action of static electricity, and an electrostatic displacement measuring method.

2. Description of the Related Art

As a conventional apparatus to detect positions by the action of static electricity, there have been known an electrostatic capacity encoder disclosed in Jpn. Pat. Appln. KOKAI Publication No. 1-29409 and a capacitive position measuring transducer disclosed in Jpn. Pat. Appln. KOKAI Publication No. 4-67881 (U.S. Pat. No. 4,879,508). They have been commercialized as digital calipers. The digital calipers consume small electric power and can be driven with a battery. Thus, they have been widely used in workshops for accurately measuring the lengths of work pieces.

The basic principles of the apparatus disclosed in the above Jpn. Pat. Appln. KOKAI Publication No. 1-29409 and No. 4-67881 are the same. That is, many electrodes are arranged on a scale marked with graduations, and a plurality of transmitting and receiving electrodes is provided in a measuring unit opposite to the electrodes of the scale. The positional relationship between the scale and the measuring unit is measured by the phase of the received signal obtained by combining these electrodes.

BRIEF SUMMARY OF THE INVENTION

According to a first aspect of the present invention, there is provided an electrostatic encoder comprising:

a movable element having electrodes;

a stator having induction electrodes and potential detection electrodes;

a voltage driving circuit configured to apply a voltage to the induction electrodes of the stator, and generate alternate potential distribution in the electrodes of the movable element by electrostatic induction;

a vector generation circuit configured to generate a vector consisting of two signal components, from outputs of the potential detection electrodes of the stator which detect the alternate potential distribution; and a phase splitter circuit configured to measure the relative displacement of the movable element to the stator, from a rotation angle of the vector consisting of the two signal components outputted from the vector generation circuit.

According to a second aspect of the present invention, there is provided an electrostatic displacement measuring method for measuring a relative displacement of a movable element having electrodes and a stator having induction electrodes and potential detection electrodes, comprising:

applying voltage to the induction electrodes of the stator, and generating an alternate potential distribution in the electrodes of the movable element;

detecting the generated alternate potential distribution by the potential detection electrodes of the stator;

generating a vector consisting of two signal components based on the detected alternate potential distribution; and measuring a relative displacement of the movable element to the stator by a rotation angle of the generated vector.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

EMBODIMENT 1

Figure 1:
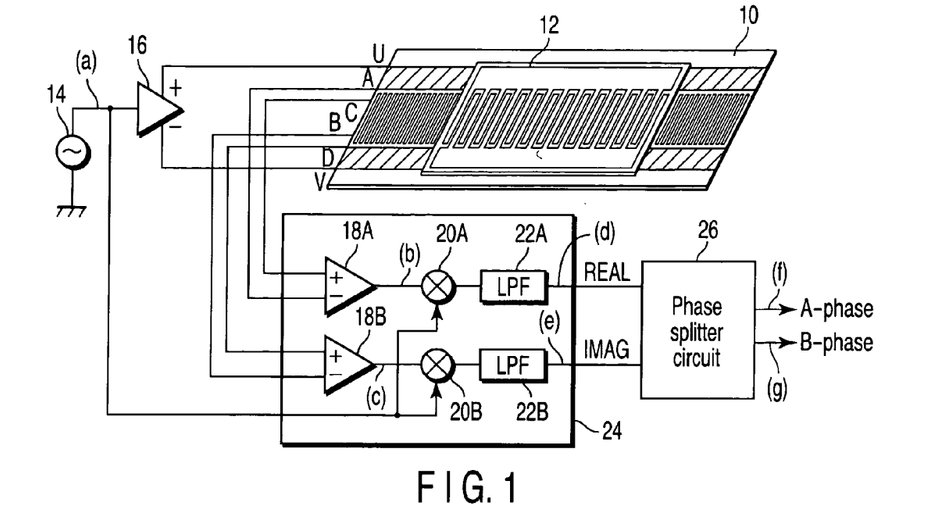
FIG. 1 is a view showing the configuration of an electrostatic encoder according to a first embodiment of the present invention.

As shown in FIG. 1, an electrostatic encoder according to a first embodiment of the present invention is basically divided into a stator 10, a sensor unit including a movable element 12 which moves sideways on the stator (in the drawing), and a peripheral circuit consisting of other electric circuits. The peripheral circuit includes an AC generator 14 and amplifier 16, as a voltage driving circuit. The output of the AC generator 14 is amplified by the amplifier 16, and applied to the terminals U and V of the stator 10 as a differential output of a carrier. The signals obtained at the terminals A and C of the stator 10 are applied to a differential amplifier 18A. The signals obtained at the terminals B and D are applied to a differential amplifier 18B. The outputs of the these differential amplifiers 18A and 18B are supplied to a synchronous demodulator consisting of multipliers 20A/20B and low-pass filters (LPF) 22A/22B in the later state. The synchronous demodulator eliminates the carrier component from the output signals of the differential amplifiers 18A and 18B, and extracts two base band signals, that is, a real part "REAL" signal and an imaginary part "IMAG" signal composed as a complex number. The two differential amplifiers 18A and 18B and synchronous demodulator (multipliers 20A, 20B and low-pass filters 22A, 22B) form a vector generation circuit 24. The above REAL and IMAGE signals are supplied to a signal phase splitter 26, multiplied there, and outputted as two increment signals of A-phase pulse and B-phase pulse corresponding to the moving distance. The multipliers 20A and 20B configuring the synchronous demodulator can be replaced by a sampling circuit if the carrier frequency is high.

Figure 2:
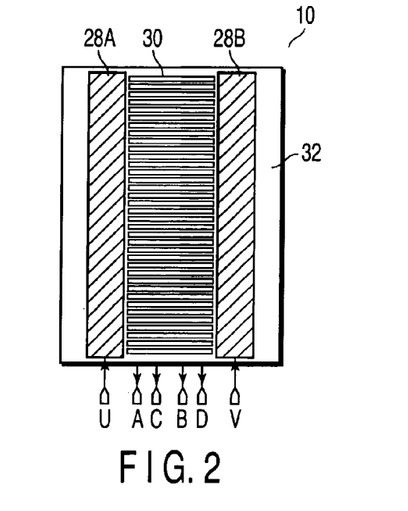
FIG. 2 is a plane view of a stator.

The stator 10 corresponding to a scale of an electrostatic encoder has induction electrodes 28A, 28B and potential detection electrodes 30, which are included in an insulator 32, as shown in FIG. 2. The above terminal U to input a carrier is connected to the induction electrode 28A, and the other terminal V is connected to the induction electrode 28B. The stator 10 configured as above can easily be manufactured by a printed circuit board or flexible printed circuit board (FPC) in general use in electronic equipment.

Figure 3:
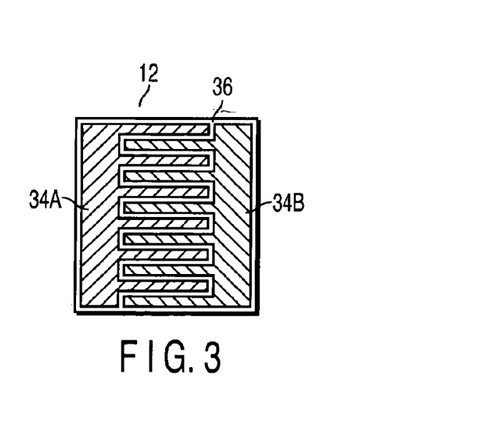
FIG. 3 is a plane view of a movable element.

The movable element 12 is placed on the stator 10. As shown in FIG. 3, the movable element 12 has comb line electrodes 34A and 34B arranged interdigitally each other in the insulator 36. The bases of these comb line electrodes 34A and 34B are arranged to overlap on the induction electrodes 28A and 28B. It is a characteristic that the movable element 12 is supplied with electrical energy through the induction electrodes 28A and 28B of the stator 10 based on the electrostatic induction described later, even if it is not connected externally. Thus, if the movable element 12 is mounted to an object to be measured, the object can be freely moved without a signal wire. The pitch of the comb line electrodes 34A and 34B of the movable element 12 shown in FIG. 3 is double the array pitch of the potential detection electrode 30 of the stator 10 shown in FIG. 2.

A long scale reference body of an encoder, called a scale, is located in the stator in this drawing. But, the basic function is unchanged even if it is provided in the movable element so that the movable element is made long and the stator connected with the signal wire is made short.

Figure 4A:
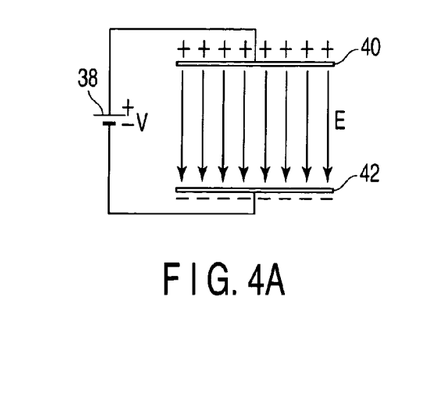
FIG. 4A is a view showing an electric field generated between electrodes.
Figure 4B:
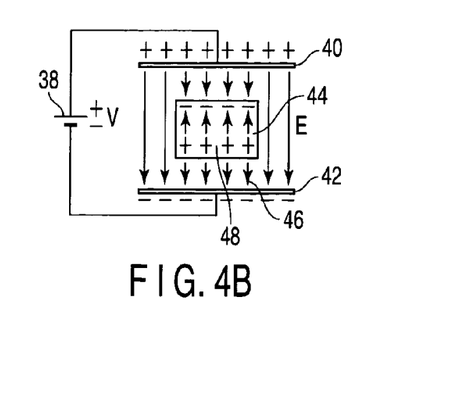
FIG. 4B is a view showing the state of electric line of force when a conductor is inserted into the electric field.

Now, an explanation will be give on the principle of electrostatic induction, which is the means for supplying electric energy by generating true electric charge in the comb line electrodes 34A and 34B of the movable element 12, with reference to FIG. 4A and FIG. 4B. As shown in FIG. 4A, when a voltage V is applied from an external power supply 38 to two electrodes 40 and 42, a positive electric charge "+" is supplied to the electrode 40 and a negative electric charge "−" is supplied to the electrode 42. Thus, an electric field E is generated between these electrodes 40 and 42. When a conductor 44 is inserted into the electric field E in this state, as shown in FIG. 4B, an electric line of force 46 from the electrode 40 to the electrode 42 is cut off. As a result, positive and negative electric charges are generated on the surface of the conductor 44 to generate an electric line of force 48 in the opposite direction to the electric line of force 46 in order to zero the electric field in the conductor 44. This is the electric charges generated in a conductor, and called a true electric charges to discriminate from the electric charges generated by dielectric polarization. Though the conductor 44 is not connected to the outside, two kinds of electric charges, positive and negative, are generated on the conductor surface as it is in an electric field. This is difficult to understand by simple common sense, but very important principle is fundamental to the practice of the present invention.

Figure 5:
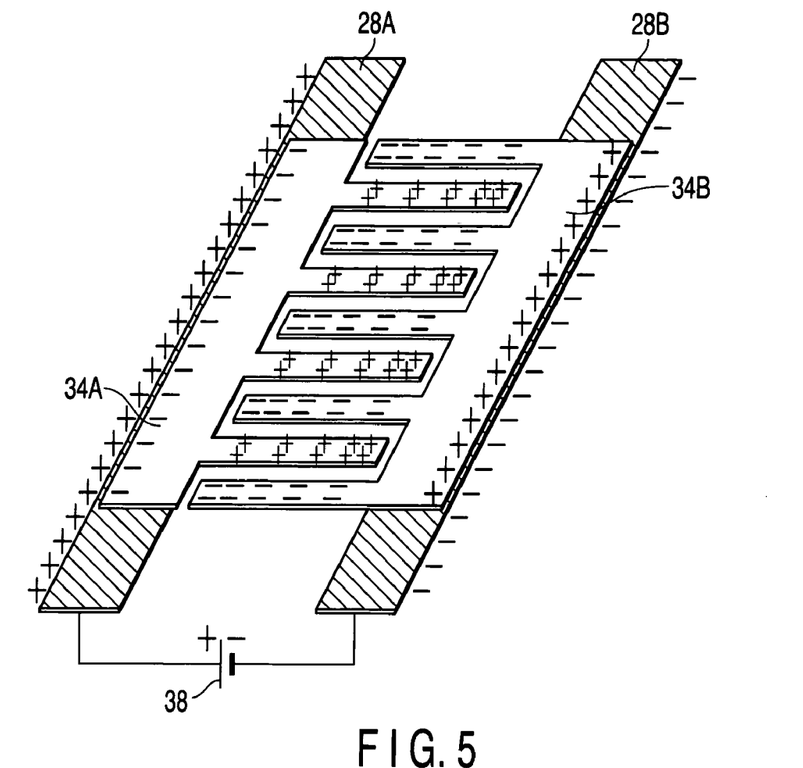
FIG. 5 is a view for explaining the principle of generating alternate electric charges in the comb line electrodes arranged interdigitally.

An explanation will be given on the principle of generating a pattern of arranging positive and negative true electric charges alternately in the comb line end electrodes of the comb line electrodes 34A and 34B of the movable element by using the above-mentioned principle of electrostatic induction, with reference to FIG. 5. A positive electric charge is applied to the induction electrode 28A of the stator 10 from the external power supply 38, and a negative electric charge is applied to the induction electrode 28B. At this time, a negative true electric charge is induced in the base of the comb line electrode 34A of the movable element 12, and a positive true electric charge is induced at the comb line end of the comb line electrode 34A. Likewise, a positive true electric charge is induced in the base of the comb line electrode 34B, and a negative true electric charge is induced at the comb line end. In the part close to the center where the comb line ends of the two comb line electrodes 34A and 34B are opposed, the electrodes are insulated and located at a short distance, and the positive and negative electric charges attract each other, and the true electric charges are distributed on the comb line surface with certain uniform density. By the electrostatic induction and two comb line electrodes arranged interdigitally, an alternate potential distribution with positive and negative true electric charges distributed alternately is formed at the part close to the center of the electrode. Particularly, by arranging two comb line electrodes interdigitally, a true electric charge is efficiently induced on the surface of the comb line electrode, facilitating generation of an alternate potential distribution.

An explanation will now be given on the state of changing the vector composed of the voltage detected by the potential detection electrode 30 according to the position of the movable element 12 with reference to FIG. 6A and FIG. 6B. Actually, as shown in FIG. 1, the movable element is driven by using the carrier signal generated from the AC generator 14, and a change with time should be considered. However, the explanation given here is based on the state that the carrier signal is cut out in a moment, that is, as a DC signal without change with time, to simplify the description.

Figure 6A:
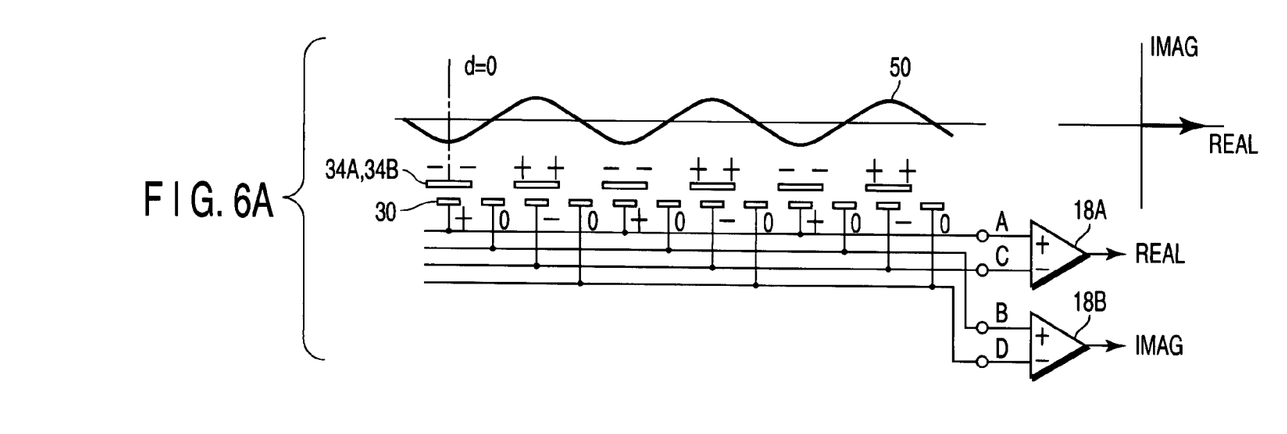
FIG. 6A is a view for explaining the alternate potential distribution and vector phase angle when the movable element is located at a position of d=0.

FIG. 6A indicates the case that the movable element 12 is placed at a position of d=0. The potential detection electrodes 30 are arranged with 4 phase electrodes. Namely, electrodes of 0° phase are connected and wired to the terminal A, electrodes of 90° phase are connected and wired to the terminal B, electrodes of 180° are connected and wired to the terminal C, and electrodes of 270° phase are connected and wired to the terminal D. As the principle of electrostatic induction has been explained by using FIG. 4A, FIG. 4B and FIG. 5, when an external voltage is applied to the induction electrodes 28A and 28B of the stator 10, true electric charges "−−", "++", "−−" and "++" are generated in the comb line electrodes 34A and 34B of the movable element, and an alternate potential distribution 50 is formed. Then, in accordance with the alternate potential distribution 50, electric charges "+", "0", "−" and "0" are repeatedly induced in the potential detection electrodes 30 of the stator 10, and positive, zero, negative and zero voltages are generated in the terminals A, B, C and D, respectively. Then, a positive voltage is generated in the differential amplifier 18A, and the output of the differential amplifier 18D becomes zero. Expressing in a complex vector by assuming that the output of the differential amplifier 18A is a real part "REAL" of a complex number and the output of the differential amplifier 18B is an imaginary part "IMAG" of a complex number, the vector of only the REAL part can be obtained.

Figure 6B:
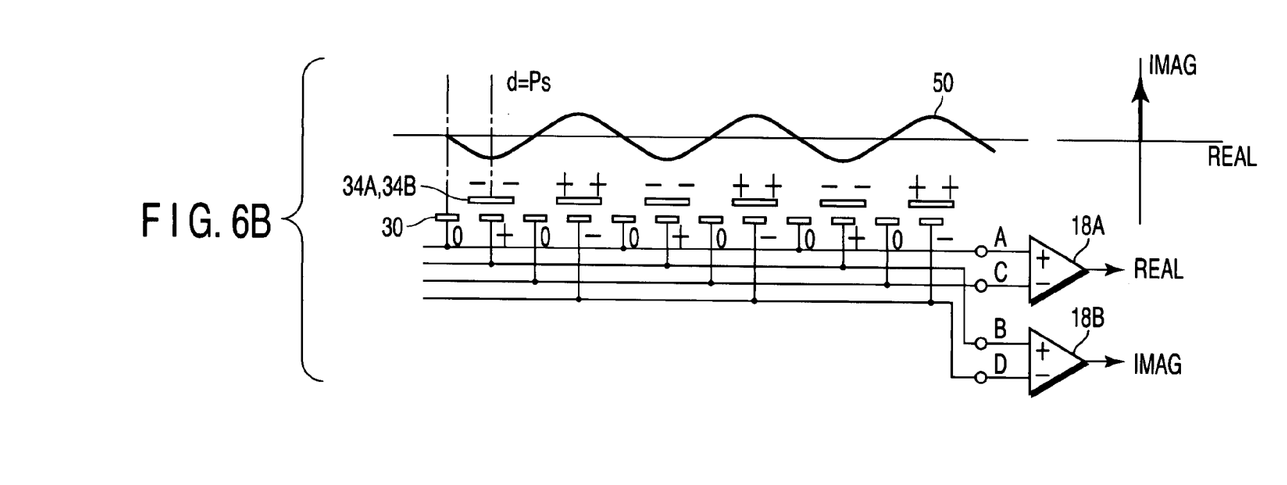
FIG. 6B is a view for explaining the alternate potential distribution and vector phase angle when the movable element is moved to the right only by the pitch distance d=Ps of the potential detecting electrodes.

FIG. 6B shows the case that the movable element 12 is moved to the right only by the pitch distance d=Ps of the potential detecting electrodes 30. In this case, electric charges "0", "+", "0" and "−" are repeatedly induced in the potential detection electrodes 30, and zero, positive, zero and negative voltages are generated in the terminals A, B, C and D, respectively. Then, a zero voltage is generated in the differential amplifier 18A, and a positive voltage is generated in the differential amplifier 18D, and only the vector of the IMAG part can be obtained in the complex vector.

As explained above, the vector angle in the complex vector is changed according to the position of the movable element 12. Each time the movable element 12 is moved with an interval of pitch Ps of the potential detection electrode 30, the vector is rotated by 90°, and returned to the original when the moving distance d=4Ps. Therefore, the position of the movable element 12 can be detected by detecting the vector angle in the complex vector. If the movement is less than the pitch, for example, the moving distance d=Ps/8, the phase change amount of the vector is 11.25° and even a very small change of movement is exactly reflected in the vector.

In an ordinary optical encoder, the positions of the stator and movable element are important, and strict positioning accuracy is required. In the electrostatic encoder of the present invention, as seen from FIGS. 6A and 6B, the alternate potential distribution 50 generated in the comb line electrodes 34A and 34B of the movable element 12 is detected by the plurality of potential detection electrodes 30 arranged in the stator 10. Thus, a desired voltage can be detected even if the comb line electrodes 34A and 34B and potential detection electrodes 30 are not completely parallel. Therefore, the stator 10 and movable element 12 can be approximately positioned, and strict positioning is unnecessary. Further, the gap between the stator 10 and movable element 12 can be separated a little as long as the signal can be detected.

The differential amplifiers 18A to input the signals of the terminals A and C and the differential amplifier 18B to input the signals of the terminals B and D are amplifiers which only output the difference. Therefore, even if an external common mode noise is contained, it does not appear in the outputs of the differential amplifiers, thus outputs with a good S/N ratio can be obtained.

Now, an explanation will be given on the operation of the synchronous demodulator in the state that the movable element 12 is moving by using an AC carrier as a driving signal with reference to FIG. 7. The signal (a) mentioned here indicates the voltage of the carrier supplied to the comb line electrodes 34A and 34B of the movable element 12, and is given by $\sin \omega t$. The signal (b) indicates the output of the differential amplifier 18B, and $K \sin vt \cdot \sin \omega t$ is detected as a function of the moving speed v. The signal (c) indicates the output of the differential amplifier 18A, and $K \cos vt \cdot \sin \omega t$ is detected as a function of the moving speed v. K is a constant determined by the whole circuit, $\omega$ is an angular frequency of the carrier. These signals (b) and (c) obtained by the stator 10 become the amplitude modulated waveforms when the strength are repeatedly inverted each time the movable element 12 is moved. Here, the moving distance is in the relation of d=vt indicating the state displaced with time.

The waveforms of the signals (b) and (c) are the amplitude modulated with the carrier as the signal (a). Since this carrier component does not include the position information, the carrier is eliminated by the synchronous demodulator using the multipliers 20A, 20B and low-pass filters (LPF) 22A, 22B, and Ksinvt of the function signal (d) of only the distance and Kcosvt of the signal (e). They are taken as the imaginary part IMAG and real part REAL in the complex vector, and the vector is rotated according to the moving distance.

Explaining as a complex number, the real part REAL and imaginary part IMAG are expressed by the following equation;

$$K \cos vt + jK \sin vt = e^{jvt} \quad (1)$$

By calculating the vector angle, the distance vt can be obtained. As the potential detection electrodes 30 have 4 phase outputs, if the movable element 12 is moved by 4 times the pitch of the potential detection electrodes, that is, d=4Ps, the vector is rotated just one turn.

Figure 7:
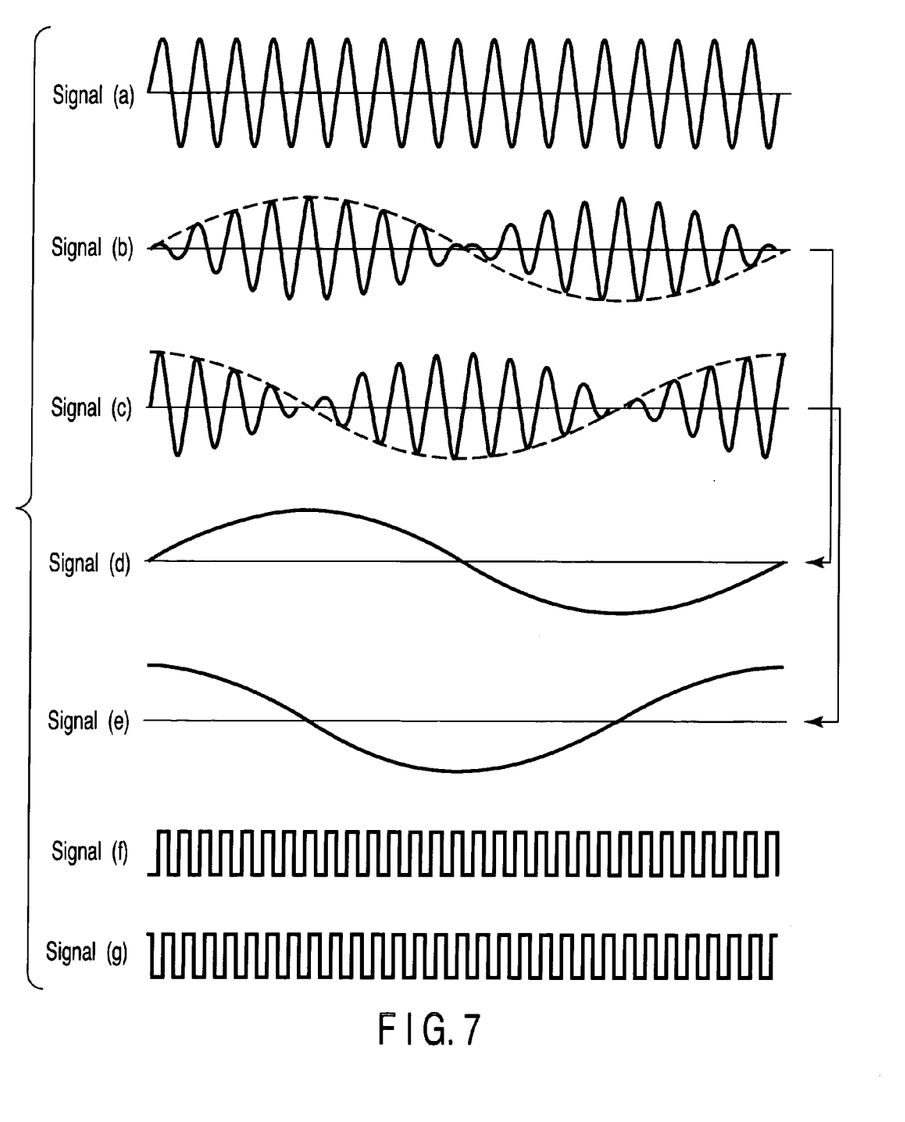
FIG. 7 is a timing chart showing the output signal waveforms of each element.

The real part REAL and imaginary part IMAG explained with reference to FIG. 7 are the same as the outputs of the differential amplifiers 18A and 18B of FIG. 6A and FIG. 6B. Even if an AC carrier is applied to the electrode of the movable element, the same signal as in the case of direct current can be obtained by the synchronous detection with the same frequency as that carrier.

The real part REAL and imaginary part IMAG handled as complex numbers are applied to the phase splitter 26 to multiply them by 30 times. The outputs are incremental signals of 30 pulses/rotation as A-phase pulse, indicated by the signal (f), and B-phase pulse, indicated by the signal (g) in FIG. 7. If the pulse multiplication time is increased in the phase splitter 26, many pulses can be outputted with a small vector rotation angle, and the apparent positioning resolution can be increased. The phase splitter 26 outputs fine A-phase and B-phase pulses based on the input vector rotation angle, according to the change in the input vector rotation angle. The A-phase and B-phase pulses are widely used as an output of an incremental encoder, and the moving direction is discriminated by the delay/advance of the phase between the A-phase and B-phase pulses.

As explained with reference to FIG. 7, when the movable element 12 is moving at a certain speed v, the function Ksinvt consisting of the distance vt at that speed is detected as indicated by the signal (d), and the function Kcosvt is detected as indicated by the signal (e). They are processed by complex numbers and the vector rotation angle is obtained, thereby the distance at each moment in the moving state is obtained. The imaginary part IMAG of the vector is related to the signal (d), and the real part REAL is related to the signal (e). The frequency corresponds to the speed of the movable element. Thus, this embodiment can measure the position at each moment without being influenced by the speed of the moving object.

The multipliers 20A, 20B and low-pass filters 22A, 22B shown in FIG. 1 form a synchronous demodulator. This is the same principle of an apparatus called a lock-in amplifier, which detects a changed component of a signal buried in noise by using an AC signal as a reference wave. The low-pass filters 22A and 22B have the function to eliminate the carrier component sinωt. By setting the bandwidth to be correspond to the maximum speed, an unnecessary noise component is removed and only a desired signal component is detected.

The merit of adopting an actual driving waveform to an AC carrier signal is to increase the efficiency of signal transmission between electrodes, in addition to the above-mentioned elimination of noise in a lock-in amplifier. The above explanation has been given on the generation of alternate potential distribution in the comb line electrodes 34A and 324B based on the principle of electrostatic induction with reference to FIGS. 4A and 4B and FIG. 5. The bases of the induction electrodes 28A and 28B of the stator 10 and the comb line electrodes 34A and 34B of the movable element 12 form an electrolytic capacitor, and electric energy is efficiently transmitted to the movable element 12 as the frequency rises if an AC carrier is used. Under the principle of electrostatic induction explained in FIGS. 4A and 4B, even if the voltage applied to the electrodes 40 and 42 is changed to AC, electrostatic induction occurs as in the case of DC, though the polarity of the induction electrode is alternately switched to positive and negative. In this case, by setting the AC frequency to several kHz to several 10 kHz, circuits including the synchronous demodulator consisting of the multipliers 20A, 20B and low-pass filters 22A, 22B can be relatively simply formed. Further, as AC current is used for driving, the electrodes are always changed to positive and negative, and charging between and around unnecessary electrodes does not occur, thus enabling stable operation.

Signals applied to the induction electrodes 28A and 28B of the stator 10 are generated merely by creating an alternate potential distribution in the comb line electrodes 34A and 34B of the movable element 12. Further, the potential is efficiently detected by the differential amplifiers 18A and 18B. Due to the above, the application voltage may be relatively small, and low power consumption can be realized, as in the conventional digital calipers.

The configuration of the vector generation circuit 24 shown in FIG. 1 uses an AC signal as a driving signal, and has a synchronous demodulator comprising multipliers 20A, 20B and low-pass-filters 22A, 22B. If a sufficient S/N ratio is obtained with the potential detection electrodes 30, an AC driving signal is not necessarily required and a vector corresponding to a position can be obtained even with a DC signal, as explained in FIGS. 6A and 6B. Therefore, when a DC driving signal is used, the vector generation circuit 24 may be composed of only differential amplifiers 18A and 18B.

Based on the operation principle as explained above, assuming that the array pitch Ps of the potential detection electrodes 30 of the stator 10 is 300 μm and the pulse multiplication of the phase splitter 26 is 30, for example, a position can be detected with a resolution of 10 μm.

Namely, the electrostatic encoder according to the first embodiment generates an alternate potential distribution by inducing electric charges in the comb line electrodes 34A and 34B of the movable element 12, detects the alternate potential distribution by the opposite potential detection electrodes 30, generates a vector consisting of two signals (real part REAL and imaginary part IMAG of a complex number), and measures the position and/or angle of the movable element 12 according to the vector rotation angle, based on the principle of electrostatic induction. Therefore, since the phase itself is not related to the displacement, but the displacement is detected from the vector rotation angle, the response to the change with time of a movable element is good, and an error is not included when measuring a movable element. Either an AC or DC signal may be applied to the induction electrodes 28A and 28B of the stator 10.

By setting the potential detection electrodes 30 of the stator 10 to 4 phases, it is possible to efficiently detect the signal corresponding to the space of 90° phase interval, generate a vector by the vector generation circuit 24 from a difference signal of 0° and 180° phases and a difference signal of 90° and 270°, and measure the position of the movable element according to the vector rotation angle. Therefore, an external noise in common mode is eliminated by utilizing a difference signal generated by the differential amplifiers 18A and 18B. The 4-phase signals correspond to the space, and either AC or DC may be applied to the induction electrodes 28A and 28B of the stator 10.

Further, according to the electrostatic encoder of this embodiment, by applying an AC carrier signal to the induction electrodes 28A and 28B of the stator 10, the alternate potential distribution in the comb line electrodes 34A and 34B of the movable element 12 is efficiently generated, a carrier component is eliminated with the synchronous demodulator when receiving the signal, the vector is efficiently generated, and the displacement measuring accuracy is increased.

The multipliers 20A, 20B or a sampling circuit and low-pass filters 22A, 22B eliminate a carrier and extract a base band signal. The bands of the low-pass filters 22A and 22B are set to the least necessary width, and the displacement measuring accuracy is improved.

Further, the electrodes of the movable element 12 are shaped like the teeth of a comb and arranged interdigitally, and electrostatic induction can be efficiently performed and a good alternate potential distribution can be formed.

The potential detection electrodes 30 are wired and displaced at every 4 electrodes with a given cycle, which enables efficient detection of a 4-phase phase signal. The comb line electrodes 34A and 34B are interdigitally arranged and the pitch is set to double the array pitch of the potential detection electrodes 30, and the 4-phase relationship can be held and a vector corresponding to the space can be satisfactorily detected.

EMBODIMENT 2

Figure 8:
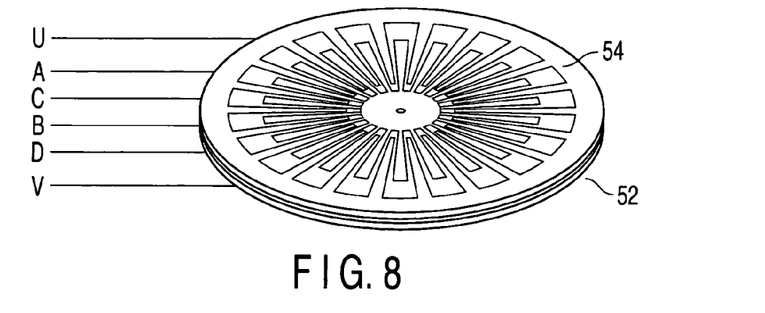
FIG. 8 is a view showing the configuration of a sensor unit of an electrostatic encoder according to a second embodiment of the invention.

An electrostatic encoder according to a second embodiment of the invention is a rotary encoder to measure the rotation angle of a rotor. A sensor unit of this encoder includes a disk-shaped stator 52 and a disk-shaped rotor 54 placed on the stator, as shown in FIG. 8. The peripheral circuit other than the sensor unit is the same as in the configuration shown in FIG. 1. Electrodes for electrostatic induction arranged in the stator 52 are placed inside and outside of the circle, and potential detection electrodes are arranged radially from the center. Two comb line electrodes are interdigitally arranged in the rotor 54. The comb line electrodes are radially arranged, and the bases of the comb line electrodes are arranged inside and outside of the circumference.

In this rotary type, a true electric charge is supplied to the comb line electrodes of the rotor 54 by electrostatic induction, and a rotation transmission member such as a slip ring is unnecessary, and a rotation load is low.

The method used is the same as that used in an optical rotary encoder. For example, a 400/rotation potential detection electrode is arranged, and if the pulse multiplication of a phase splitter is 30, an angle resolution of 1200 pulses/rotation can be obtained.

According to the electrostatic encoder of the second embodiment, by the circular arrangement, a rotary encoder to detect the displacement of rotation angle can be realized. When applied to a motor or other high-speed rotating device, a clearance can be made between the stator 52 and the rotating movable element (rotor 54). Even if a clearance exists, there is no problem, because an AC current is used for driving and the alternate potential distribution generated by the rotor 54 can be sufficiently detected by the total area of the potential detection electrodes of the stator 52 (i.e., the opposite area is large).

EMBODIMENT 3

Figure 9:
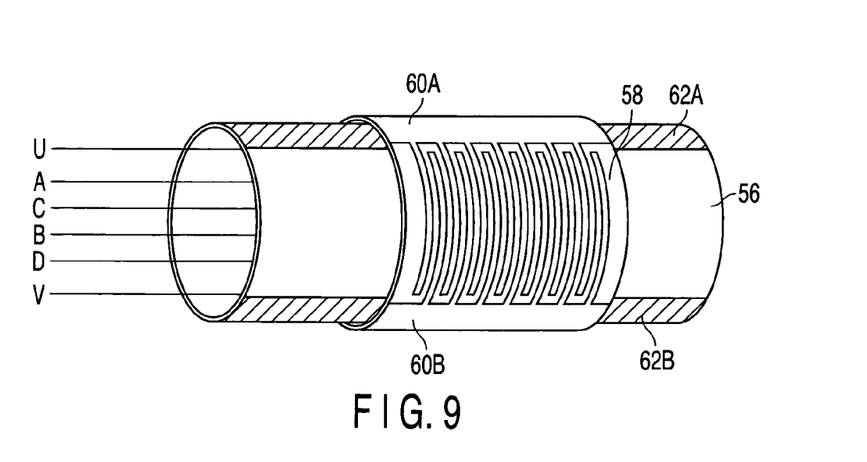
FIG. 9 is a view showing the configuration of a sensor unit of an electrostatic encoder according to a third embodiment of the invention.

An electrostatic encoder according to a third embodiment of the invention is a cylindrical encoder. A sensor unit of this encoder includes a cylindrical stator 56, as shown in FIG. 9. A cylindrical movable element 58 is disposed on the outside of the cylindrical stator 56. The movable element 58 moves parallel to the cylindrical axis. The peripheral circuit other than the sensor unit is the same as in the configuration shown in FIG. 1. Comb line electrodes 60A and 60B are disposed on the cylindrical movable element 58. In the cylindrical stator 56, induction electrodes 62A and 62B are disposed opposite to the comb line electrodes 60A and 60B of the movable element so that the bases of the electrodes efficiently perform electrostatic induction. The cylindrical movable element 58 is placed outside the cylindrical stator 56, but may also be easily disposed inside the stator 56, though not shown in the drawing.

The operation of the above-mentioned cylindrical encoder is similar to a cylinder/piston, but has a merit in that the inside is hollow.

According to the electrostatic encoder of the third embodiment, displacement of a hollow shape can be measured by arranging cylindrically. Even if a clearance is made between the cylindrical movable element 58 and stator 56, the opposite area is large and a desired signal can be detected, applicable to movement at a high speed.

EMBODIMENT 4

Figure 10:
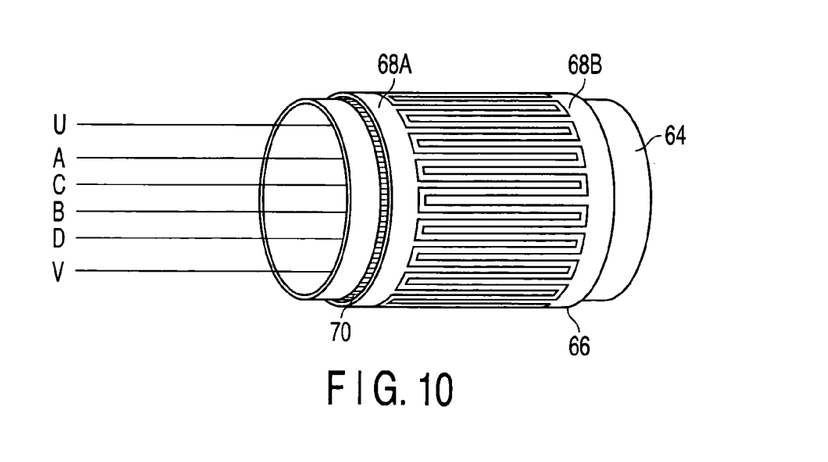
FIG. 10 is a view showing the configuration of a sensor unit of an electrostatic encoder according to a fourth embodiment of the invention.

An electrostatic encoder according to a fourth embodiment of the invention is an electrostatic encoder with a cylindrical rotor rotating in the circumferential direction. The peripheral circuit other than a sensor unit is the same as in the configuration shown in FIG. 1. The sensor unit of this encoder includes a cylindrical stator 64 as shown in FIG. 10. A cylindrical rotor 66 is disposed outside the cylindrical stator 64. Comb line electrodes 68A, 68B and not-shown potential detection electrodes of the stator 64 are arranged parallel to the cylindrical axis. In the stator 64, an induction electrode 70 is disposed opposite to the base of the comb line electrode 68A of the rotor 66. The induction electrode 70 is also disposed opposite to the base of the comb line electrode 68B, thought not shown.

This encoder is rotated with a roller. In this case also, like the disk-shaped rotary encoder explained in FIG. 8, a connection mechanism such as a slip ring to supply electric charges to the movable element is unnecessary, which simplifies the configuration.

The encoders of the third embodiment and this embodiment are characterized in that the surfaces of the stators 56 and 64 can be curved to meet the shape of cylindrical movable element 58 or cylindrical rotor 66. In an optical encoder, a sensor is provided at one position. In these embodiments, the detection area is the whole circumference and a detection signal is averaged, and strict sensor fitting accuracy is unnecessary.

According to the electrostatic encoder of the fourth embodiment, the displacement of the rotation angle of a hollow shape can be measured by the cylindrical arrangement. When this is applied to a motor or other high-speed rotating body, it is possible to make a clearance between the stator 64 and a rotating movable element (rotor 66). Even if a clearance exists, there is no problem, because an AC current is used for driving and the alternate potential distribution generated by the rotor 66 can be sufficiently detected by the total area of the potential detection electrodes of the stator 64 (i.e., the opposite area is large).

The above-explained electrostatic encoders according to first to fourth embodiments supply electric charges to a movable element by electrostatic induction, generate an alternate potential distribution in the interdigitally arranged comb line electrodes, and detect the position of the movable element by the rotation angle of the vector indicated by a complex number obtained by synchronously demodulating the signals of the potential detection electrodes of the stator. Therefore, the following many effects can be obtained.

(a) Displacement is detected by a vector rotation angle, and high speed response is obtained and measurement of a movable element is possible.

(b) Movable element and stator are simply configured by arranging simple electrodes only, realizing an encoder including a very thin and compact sensor unit.

(c) A signal wire to a movable element is unnecessary, and the bending load of a signal wire is eliminated, a rotary encoder can also be easily performed, and high reliability can be obtained.

(d) An alternate potential distribution generated in a movable element is detected by plurality of potential detection electrodes arranged in a stator, and the position of a movable element can be measured without strictly adjusting the mechanical position of a movable element.

Figure 11:
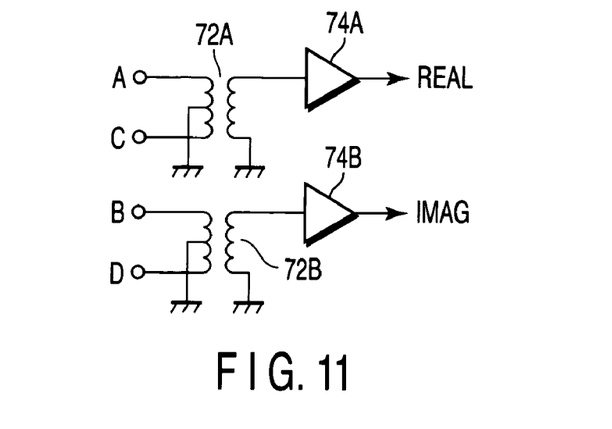
FIG. 11 is a circuit diagram showing the configuration when using a differential transformer and amplifier instead of a differential amplifier.

The present invention has been explained based on the embodiments hereinbefore. The invention is not limited to the described embodiments. Various modification and applications are possible within the essential characteristics of the invention. For example, as shown in FIG. 11, the differential transformer 72A and amplifier 74A or differential transformer 72B and amplifier 74B may be used instead of the differential amplifiers 18A and 18B shown in FIG. 1, FIG. 6A and FIG. 6B. Use of these differential transformers provides the effect of simultaneously converting impedance.

In the second and fourth embodiments shown in FIG. 8 and FIG. 10, application to high speed moving elements such as a motor has been explained. In this case, it is permitted to make a clearance between the stator 52 or 64 and rotor 54 or 66. Even if a clearance is taken, there is no problem, because an AC current is used for driving and the alternate potential distribution generated by the rotor 54 or 66 can be sufficiently detected by the total area of the potential detection electrodes of the stator 52 or 64 (i.e., the opposite area is large).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrostatic encoder comprising:
a movable element having electrodes;
a stator having induction electrodes and potential detection electrodes;
a voltage driving circuit configured to apply a voltage to the induction electrodes of the stator, and generate alternate potential distribution in the electrodes of the movable element by electrostatic induction;
a vector generation circuit configured to generate a vector consisting of two signal components, from outputs of the potential detection electrodes of the stator which detect the alternate potential distribution; and
a phase splitter circuit configured to measure the relative displacement of the movable element to the stator, from a rotation angle of the vector consisting of the two signal components outputted from the vector generation circuit.

2. The encoder according to claim 1, wherein
the potential detection electrodes of the stator are arranged as 4 phase potential detection electrodes,
the vector generation circuit includes:
a first differential amplifier configured to receive the 0° phase component and 180° phase component of the potential detection electrodes as inputs; and
a second differential amplifier configured to receive the 90° phase component and 270° phase component of the potential detection electrodes as inputs, and
the vector generation circuit is configured to output the vector consisting of the two signal components from the first and second differential amplifiers.

3. The encoder according to claim 2, wherein
the voltage driving circuit includes an AC generator configured to apply a carrier signal to the induction electrodes of the stator, and
the vector generation circuit further includes a synchronous demodulator configured to eliminate the carrier signal component from the outputs of the first and second differential amplifiers.

4. The encoder according to claim 3, wherein
the synchronous demodulator includes one of multipliers and sampling circuits, and low-pass filters, and
a band of the each low-pass filter is set corresponding to a maximum moving speed of an object to be measured.

5. The encoder according to claim 3, wherein first and second differential amplifiers include a differential transformer and an amplifier.

6. The encoder according to claim 3, wherein the electrodes of the movable element include a comb line first electrode and a substantially same shape second electrode which are arranged interdigitally and relatively.

7. The encoder according to claim 3, wherein
the potential detection electrodes of the stator are wired and disposed at every four electrodes with a given cycle,
the electrodes of the movable element include a pair of electrodes whose electrode ends are arranged interdigitally and relatively, and
an array pitch of the electrode ends of the pair of electrodes of the movable element is double an array pitch of the potential detection electrodes of the stator.

8. The encoder according to claim 3, wherein
the movable element has, as the electrodes, a first electrode with comb line ends spreading radially, and a second electrode with comb line ends disposed centripetally, which are arranged interdigitally and relatively, and is rotated and moved relatively to the stator, the stator is incorporated with two or more induction electrodes arranged on a disk, and potential detection electrodes wired and disposed at every four electrodes with a given cyclic angle, and
the encoder detects a rotation angle.

9. The encoder according to claim 3, wherein
the electrodes of the movable element include a comb line first electrode and a second electrode having the substantially same shape as the first electrode and are arranged interdigitally and relatively to the first electrode, the first and second electrodes arranged on a cylindrical straight line,
the stator is incorporated with two or more induction electrodes arranged on a cylindrical straight line, and the potential detection electrodes arranged to be a straight line, and
the encoder detects movement in a direction of the cylindrical straight line.

10. The encoder according to claim 3, wherein
the electrodes of the movable element includes a comb line first electrode and a second electrode having the substantially same shape as the first electrode and are arranged interdigitally and relatively to the first electrode, the first and second electrodes arranged on a cylindrical circumference,
the stator is incorporated with two or more induction electrodes arranged on a cylindrical circumference, and the potential detection electrodes arranged to be a circumference, and
the encoder detects a rotation angle in the circumference direction.

11. The encoder according to claim 2, wherein first and second differential amplifiers include a differential transformer and an amplifier.

12. The encoder according to claim 2, wherein the electrodes of the movable element include a comb line first electrode and a substantially same shape second electrode which are arranged interdigitally and relatively.

13. The encoder according to claim 2, wherein
the potential detection electrodes of the stator are wired and disposed at every four electrodes with a given cycle,
the electrodes of the movable element include a pair of electrodes whose electrode ends are arranged interdigitally and relatively, and
an array pitch of the electrode ends of the pair of electrodes of the movable element is double an array pitch of the potential detection electrodes of the stator.

14. The encoder according to claim 2, wherein
the movable element has, as the electrodes, a first electrode with comb line ends spreading radially, and a second electrode with comb line ends disposed centripetally, which are arranged interdigitally and relatively, and is rotated and moved relatively to the stator,
the stator is incorporated with two or more induction electrodes arranged on a disk, and potential detection electrodes wired and disposed at every four electrodes with a given cyclic angle, and
the encoder detects a rotation angle.

15. The encoder according to claim 2, wherein
the electrodes of the movable element include a comb line first electrode and a second electrode having the substantially same shape as the first electrode and are arranged interdigitally and relatively to the first elec trode, the first and second electrodes arranged on a cylindrical straight line, the stator is incorporated with two or more induction electrodes arranged on a cylindrical straight line, and the potential detection electrodes arranged to be a straight line, and the encoder detects movement in a direction of the cylindrical straight line.

16. The encoder according to claim 2, wherein the electrodes of the movable element includes a comb line first electrode and a second electrode having the substantially same shape as the first electrode and are arranged interdigitally and relatively to the first electrode, the first and second electrodes arranged on a cylindrical circumference, the stator is incorporated with two or more induction electrodes arranged on a cylindrical circumference, and the potential detection electrodes arranged to be a circumference, and the encoder detects a rotation angle in the circumference direction.

17. The encoder according to claim 1, wherein the electrodes of the movable element include a comb line first electrode and a substantially same shape second electrode which are arranged interdigitally and relatively.

18. The encoder according to claim 1, wherein the potential detection electrodes of the stator are wired and disposed at every four electrodes with a given cycle, the electrodes of the movable element include a pair of electrodes whose electrode ends are arranged interdigitally and relatively, and an array pitch of the electrode ends of the pair of electrodes of the movable element is double an array pitch of the potential detection electrodes of the stator.

19. The encoder according to claim 1, wherein the movable element has, as the electrodes, a first electrode with comb line ends spreading radially, and a second electrode with comb line ends disposed centripetally, which are arranged interdigitally and relatively, and is rotated and moved relatively to the stator, the stator is incorporated with two or more induction electrodes arranged on a disk, and potential detection electrodes wired and disposed at every four electrodes with a given cyclic angle, and the encoder detects a rotation angle.

20. The encoder according to claim 1, wherein the electrodes of the movable element include a comb line first electrode and a second electrode having the substantially same shape as the first electrode and are arranged interdigitally and relatively to the first electrode, the first and second electrodes arranged on a cylindrical straight line, the stator is incorporated with two or more induction electrodes arranged on a cylindrical straight line, and the potential detection electrodes arranged to be a straight line, and the encoder detects movement in a direction of the cylindrical straight line.

21. The encoder according to claim 1, wherein the electrodes of the movable element includes a comb line first electrode and a second electrode having the substantially same shape as the first electrode and are arranged interdigitally and relatively to the first electrode, the first and second electrodes arranged on a cylindrical circumference, the stator is incorporated with two or more induction electrodes arranged on a cylindrical circumference, and the potential detection electrodes arranged to be a circumference, and the encoder detects a rotation angle in the circumference direction.

22. An electrostatic displacement measuring method for measuring a relative displacement of a movable element having electrodes and a stator having induction electrodes and potential detection electrodes, comprising:

applying voltage to the induction electrodes of the stator, and generating an alternate potential distribution in the electrodes of the movable element;

detecting the generated alternate potential distribution by the potential detection electrodes of the stator;

generating a vector consisting of two signal components based on the detected alternate potential distribution; and measuring a relative displacement of the movable element to the stator by a rotation angle of the generated vector.

* * * * *